April 17, 1956 H. CHEFTEL ET AL 2,741,978
APPARATUS FOR CANNING SARDINES AND THE LIKE
Filed Oct. 3, 1949 6 Sheets-Sheet 1
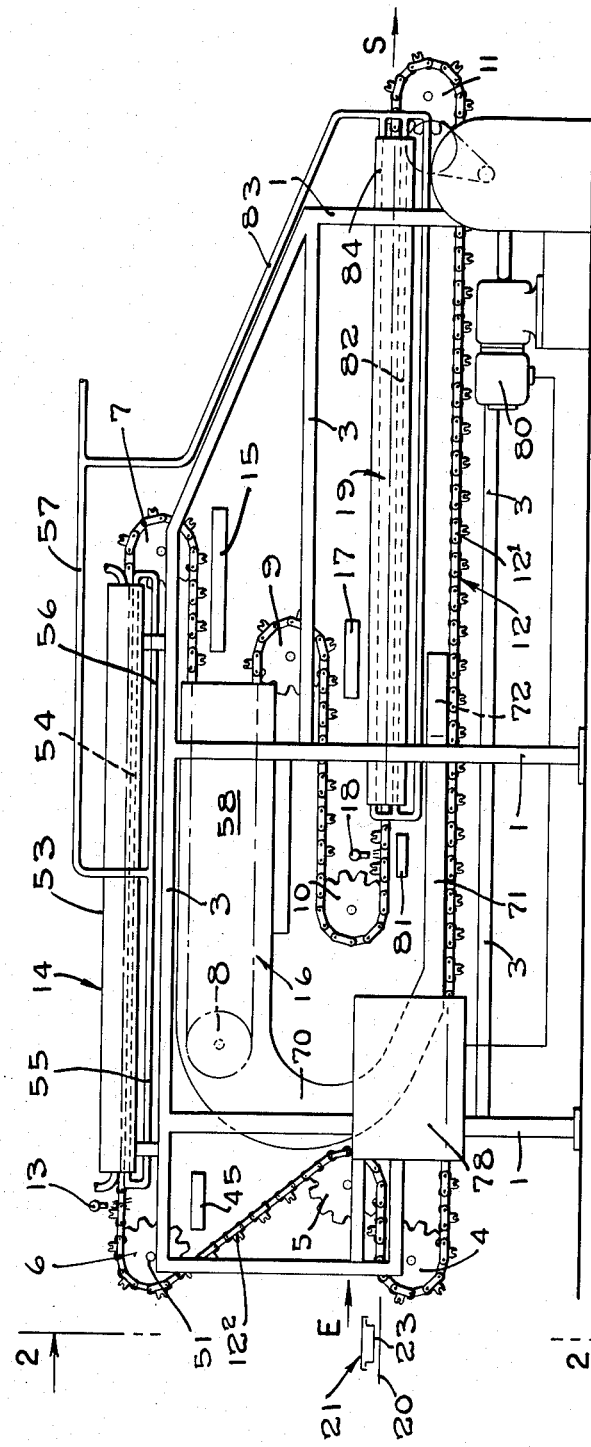
INVENTORS
HENRI CHEFTEL
EMILE FRANCOIS SANDERS
BY
ATTORNEY

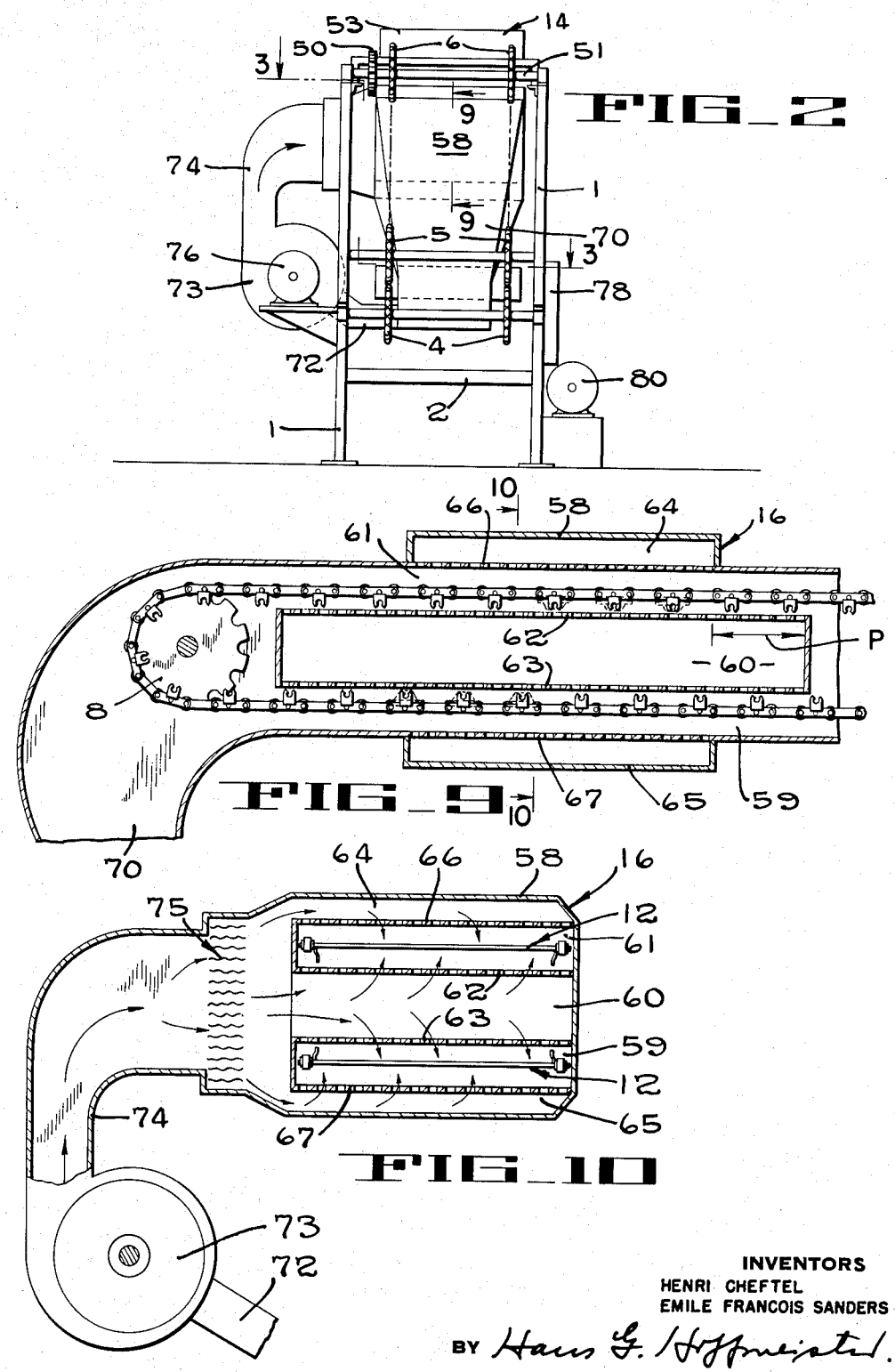

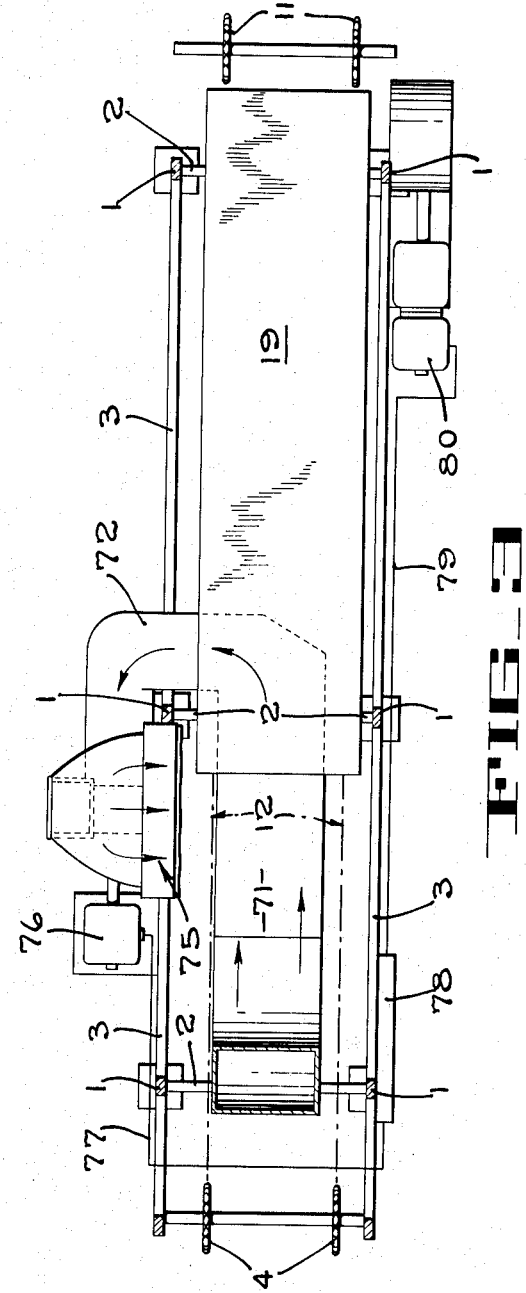

April 17, 1956     H. CHEFTEL ET AL     2,741,978
APPARATUS FOR CANNING SARDINES AND THE LIKE
Filed Oct. 3, 1949     6 Sheets-Sheet 4
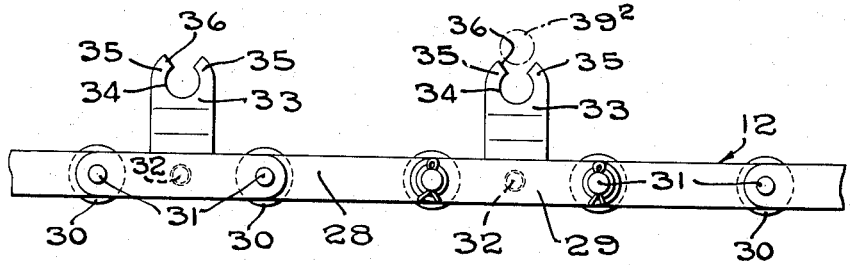
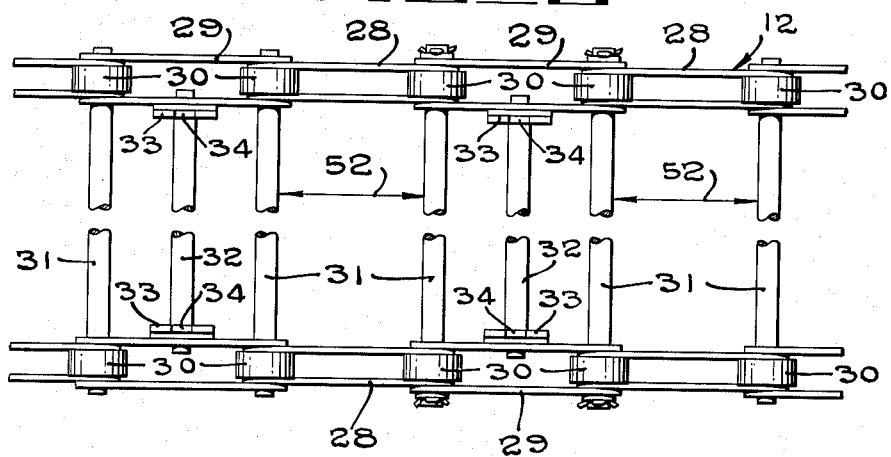
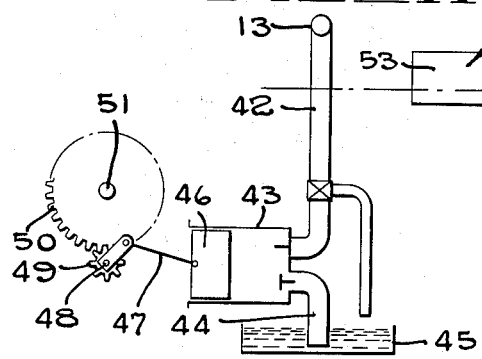
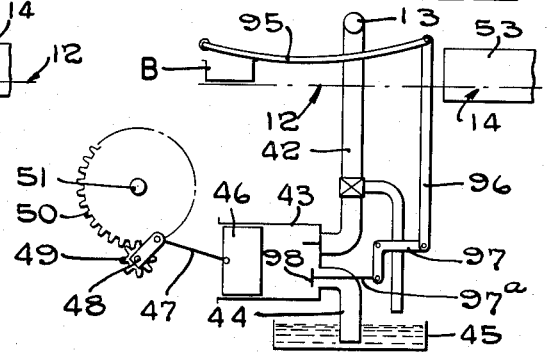
INVENTORS
HENRI CHEFTEL
EMILE FRANCOIS SANDERS
BY Hans G. Hoffmeister
ATTORNEY

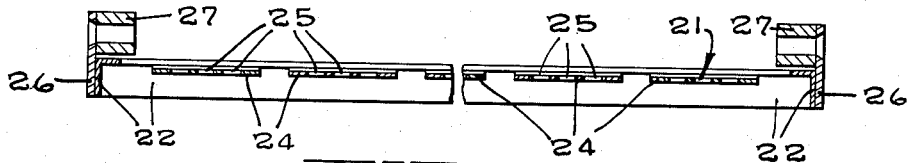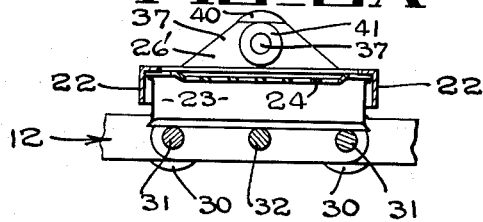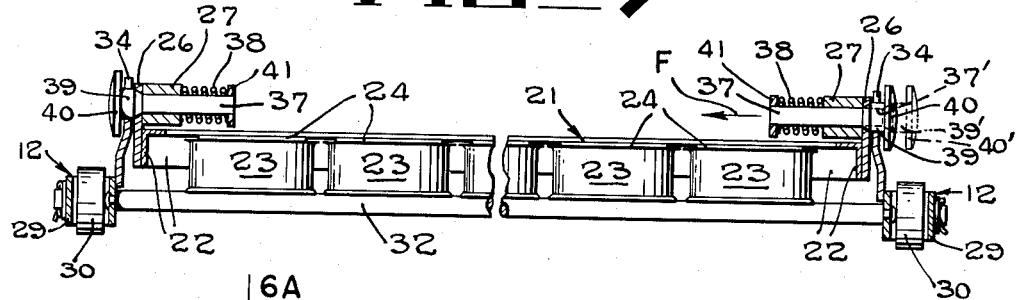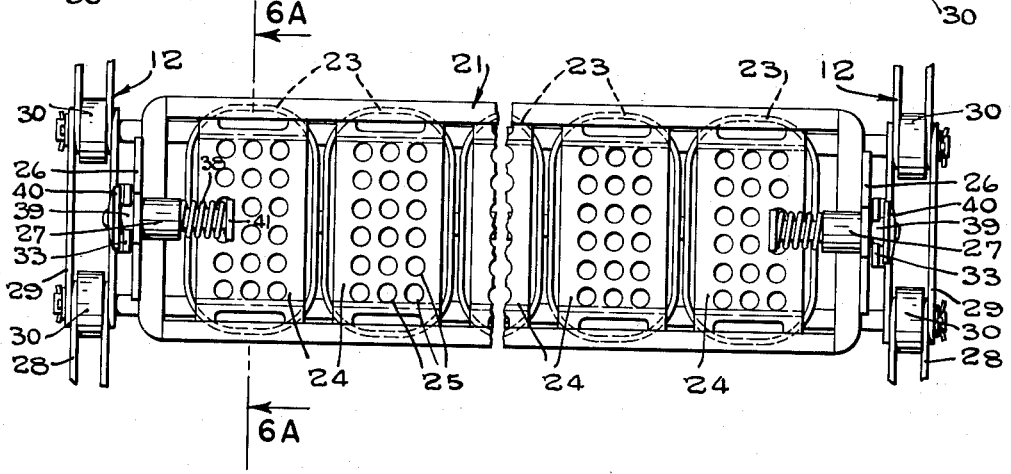

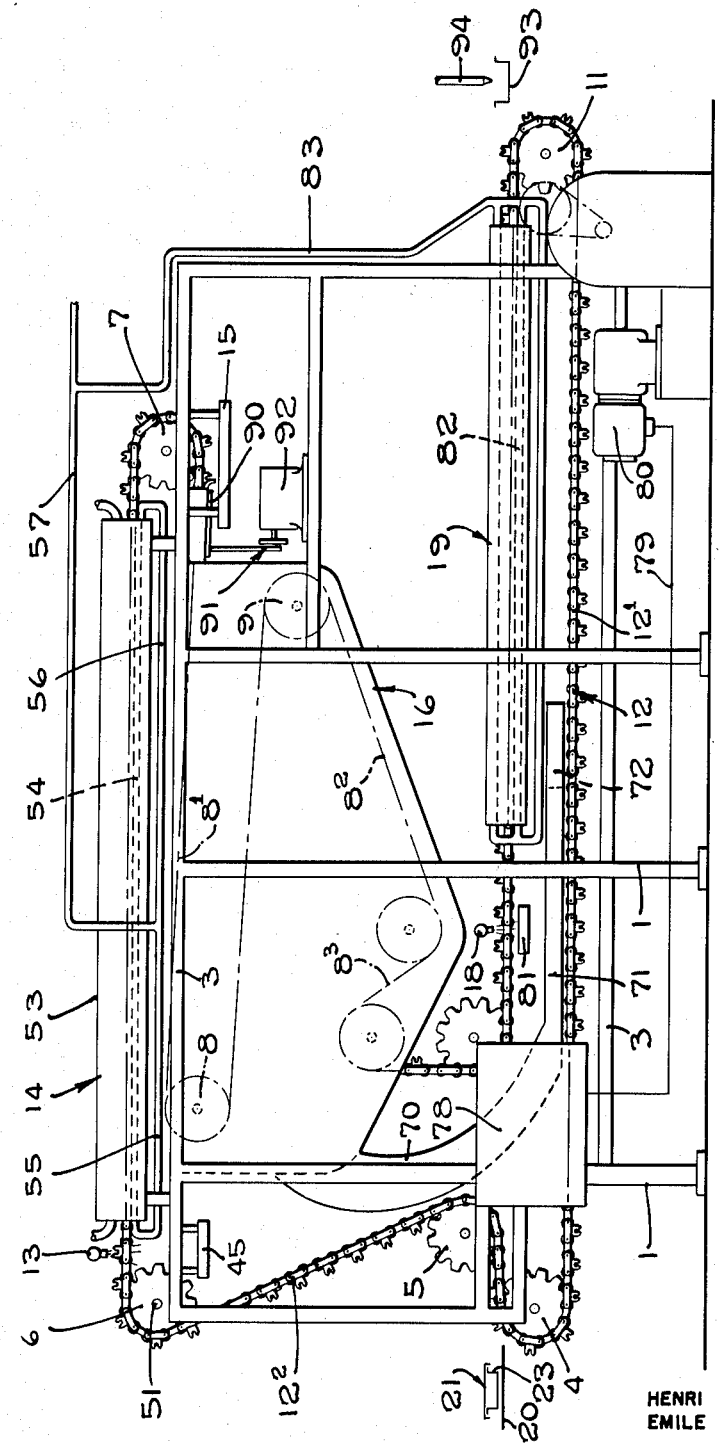

United States Patent Office 2,741,978
Patented Apr. 17, 1956

2,741,978

APPARATUS FOR CANNING SARDINES AND THE LIKE

Henri Cheftel, Paris, France, and Emile François Sanders, Saint-Nicolas-Waes, Belgium, assignors to International Machinery Corporation, Societe Anonyme, Saint-Nicolas-Waes, Belgium, a Belgian company Application October 3, 1949, Serial No. 119,376

4 Claims. (Cl. 99—443)

Our invention concerns the preparation of sardines and like fish for preservation in cans called tins.

Most of the methods used heretofore for preparing fish for canning and more particularly those of the Clupeida family such as sardines, herrings, sprats, pilchards, anchovies and the like, through sterilization inside fluid-tight receivers require a number of distinct operations after removing the heads and if desired the viscera of the fish; the fish are generally first immersed in brine and they stay (usually for a fairly long time) in a solution of kitchen salt after which they are rinsed, submitted to a partial drying through hot air and lastly cooked either in frying oil or in kilns heated with hot air or through radiation. It is only after cooling that the fish thus prepared are placed in containers such as metal cans or glass jars in which they are to be preserved.

This succession of operations requires considerable time and necessitates the use of a number of apparatuses occupying much space, while leading to extensive handling that is often prejudicial to the fish and produces consequently a considerable and undesirable percentage of waste.

Various procedures and various apparatuses have heretofore been employed for simplifying and speeding up the above described operations and for providing for their automatic performance.

The basic idea of these various procedures consists in placing the raw fish in the tins and performing the cooking operation inside said tins, in that they are caused to pass through a suitable kiln or furnace. The heating is obtained by means of steam, whether superheated or otherwise, or hot air, or else through radiation or the like means. When the fish are entirely or partly cooked, the tins are turned upside down so as to allow the draining of the product.

In one type of prior known apparatus, the draining is performed in two stages; after a first cooking stage, the tins are removed from the kiln and drained whereupon they are returned into the kiln for a further cooking stage following which they are again drained.

However, the fish canning industry throughout the world is unanimous in considering that these prior methods and apparatuses do not yield products that are comparable from the standpoint of quality with those that are obtained through the cooking in oil, in steam or inside an oven of fish carried on grills.

The various methods and apparatuses referred to hereinabove always require before the tinning of the fish an immersion in brine and their remaining in a solution of kitchen salt or in sea water. On the other hand a given method or apparatus resorts only to a single manner of cooking the fish either in steam or in a mixture of steam and hot air or in hot air or again through radiating heat.

The preliminary immersion in brine is a tedious operation requiring a considerable expenditure of labor.

The present invention is based on the discovery that the preliminary immersion of the fish in brine may be dispensed with, provided there is introduced into the tin, before the fish, a certain amount of brine of a predetermined suitable concentration. It is an essential feature of the invention to introduce the brine into the tins before the fish, failing which it is not possible to obtain a final product showing the desired properties.

The concentration of the brine and the brief lapse of time between the moment at which the fish enters the tins and that at which the tins enter the cooking apparatus may be modified as required in accordance with the size of the fish and the degree of saltness it is desired to bestow on the final products.

It has been observed also that it is a fundamental error to use a single method of cooking and that the results obtained are far better when the cooking procedure is performed in a succession of stages through a suitable modification in the actual cooking procedure, that is in the vehicle used for the calorific energy.

When treating sardines (*Clupea pilchardus*) fished from the coasts of France and North Africa, the sequence of treatments that appears to be the best consists in a first steaming followed by a draining of the product. The tins held in upside down position are then submitted to a first cooking by means of hot air after which they are turned back into normal position and submitted to a second cooking through hot air, which latter is followed by a further draining. There is then added a covering liquid such as oil, diluted brine or the like and the tins pass into a further steaming chamber after which they are removed out of the apparatus and are closed and sterilized inside a pressure cooker.

In those cases where the fish are covered with oil, it is very important that no drop of condensed water may fall on to the product and consequently the last steaming chamber includes a jacketed ceiling or cover the temperature of which is always held higher by a few degrees centigrade than the temperature of the steam introduced into the chamber. Thus no condensation is allowed.

The method according to the invention consists thus in its principle in the fact that, after removing if required the heads and viscera if such is desired, the fish are introduced in raw condition into the tins and are submitted, while remaining in said tins, in succession to a brining operation then to a first cooking operation, to a draining operation, to a second cooking operation and a second draining operation, after which there is poured into the tins a covering of edible liquid and the tins are preferably subjected to a preliminary heating before closing and sterilization.

The duration of each stage of the treatment, the number of such stages and the sequence thereof may vary according to the nature of the fish and the result sought for. The essential feature resides in the succession and if required the alternating application of different methods of heating which are intended to purge, seal, partly dry, cook the fish throughout and to impregnate it with oil.

In the practical embodiment of the invention, the tins are submitted to different successive treatments and to this purpose they are arranged in rows which are secured to a continuously operating conveyor, preferably an endless chain.

The invention provides also an apparatus for the practical performance of the method, which apparatus is characterized by the fact that it includes an endless chain acting as a conveyor for the rows of tins and serving as means for hooking thereto temporary perforated covers while the travel of said endless chain is designed in a manner such that, after passing through the first cooking apparatus and through the second cooking apparatus, the tins may be each time turned upside down so as to allow their draining.

The invention will be further described by way of example with reference to the accompanying drawings in which:

Fig. 1 is a diagrammatic view showing the apparatus as a whole in side elevation.

Fig. 2 is a diagrammatic end view taken along line 2—2 of Fig. 1, intended more particularly to show the circuit of the drying air.

Fig. 3 is a diagrammatic section taken along line 3—3 of Fig. 2.

Figs. 4 and 5 show respectively in elevation and in plan view part of an endless chain adapted for use in said apparatus.

Fig. 6 is a vertical longitudinal section of a temporary cover adapted to be positioned over a row of tins during the successive treatments thereof.

Figs. 7 and 8 are respectively a vertical sectional view and a plan view showing the means for engaging the covers on to the endless chain.

Fig. 6A is a section through line 6A—6A of Fig. 8.

Fig. 9 is a diagrammatic section taken along line 9—9 of Fig. 2.

Fig. 10 is a diagrammatic section taken along line 10—10 of Fig. 9.

Fig. 11 is a diagrammatic showing of the means for pumping the brine and the covering liquid.

Fig. 12 is a view similar to Fig. 1 of a modification and

Fig. 13 is a view similar to Fig. 11 of a further pumping mechanism.

As more particularly apparent from inspection of Figs. 1, 2 and 3, said apparatus includes a framework constituted chiefly by upright 1 connected with one another through the cross-members 2 and the longitudinal bars 3.

This frame carries sprockets 4 to 11 serving for the guiding of a continuously operating conveyor which latter is constituted in the example illustrated by an endless chain 12 the runs of which are arranged in superposed relationship. Said chain is illustrated with further detail in Figs. 4 and 5 and serves for conveying in succession rows of tins introduced at E (Fig. 1) underneath a brine distributor in the form of a pipe 13, through cooking means 14, to first draining means 15, through a kiln 16 fed with hot air, to second draining means 17, underneath a distributor in the form of a pipe 18 feeding the covering of edible liquid and lastly to a final optional apparatus such as a tunnel-shaped kiln 19 that is preferably incorporated in the apparatus for preheating the tins before sterilizing same.

The discharge for the tins treated in accordance with the method described and through the agency of this machine is provided at S and a conveyor run $12^1$ (Fig. 1) thus forms the return run for the conveyor 12 returning towards the input E where it receives further rows of tins.

The tins to be treated are brought to the input E through the agency of a separate conveyor 20, after they have been previously washed, dried, lubricated, filled with brine or water and finally packed with fish.

The addition of brine to the tins before their filling with fish allows improving the appearance of the latter. This brine is removed from the machine before the incorporation of brine at 13 just before the first cooking stage. This removal may be performed in the apparatus while the tins are passing over the conveyor run $12^2$ (Fig. 1) at the beginning of the cycle of operation.

The tins which are thus filled have been arranged in rows including a uniform number of members while generally resorting to a gauge and each row is provided with a temporary cover 21 shown separately in Fig. 6.

This cover is constituted by a rectangular sheet metal member provided with a peripheral flange 22 and shows in front of the location of each tin 23 (Fig. 7) a stamped part 24 directed towards said tin, and is perforated at 25 as shown in Fig. 8. To each of the short sides of the rectangular cover and on the outside thereof is secured preferably through welding a plate 26 projecting upwardly at $26^1$ as shown in Fig. 6A and rigidly secured to the inner side of each of said plates 26 also through welding is a socket 27 directed inwardly toward the body of the cover.

The endless chain 12 (Figs. 4 and 5) is formed as well known per se by alternating series of male and female elements as shown respectively at 28 and 29 and associated with rollers 30 connected through transverse rods 31 and it shows the particular feature of including between two transverse rods 31 a supplementary rod 32 adapted to form with the two adjacent rods 31 a carrier for the tins 23 while in front of the location of said supplementary rod 32 the element 29 or 28 carries a lug 33 directed upwardly and provided with an opening 34 for engaging the cover 21. This opening 34 is bounded at its upper end between two jaws 35 which leave between them a gap 36 the breadth of which is less than the diameter of the opening 34 itself.

For securing the cover in the desired position, a latching pin 37 under the action of a helical compression spring 38 is used (Figs. 7 and 8) and this pin is adapted to slide inside the socket 27 while it extends towards the outside of the chain in the form of an enlarged diameter portion 39, said extension ending with an abutment plate 40 and being adapted to slide inside the opening 34 in the lug 33.

The spring 38 is wound round the pin 37 so as to bear on one hand against the socket 27 and on the other hand against a terminal knob or washer 41 rigid with the pin 37.

When positioning on the chain 12 a row of tins provided with its cover 21, said positioning is made by constraining first the portion of the latching pin 37 of each securing means to rest at $39^2$ as shown in Fig. 4 over the edges of the jaws 35, said pin being held in this position by reason of the gap 36 not being large enough to allow the passage of the larger diameter portion 39. However, by then exerting an outward push on each knob 41, it is possible to make each pin 37 slide so as to bring the latching pin 37 and portions 39 and 40 thereof into the positions shown in dot and dash lines at 37′, 39′ and 40′ on the right hand side of Fig. 7 whereby the latching pin 37 may engage the gap 36 and drop inside the opening 34. When the push on the knob 41 is released, it is possible through the action of the spring 38 to cause sliding of the pin 37 in the direction illustrated by the arrow F (Fig. 7) whereby the cover is locked through engagement of the larger diameter portion 39 in the opening 34.

The distribution of the brine is performed by means of a pipe 13 as previously indicated which is arranged across and in superimposed spaced relation to the path followed by the conveyor 12 and is connected through a pipe 42 with the body 43 of a pump (Fig. 11) which sucks through a pipe 44 the brine passing out of a tank 45.

The piston 46 of said pump is controlled by a connecting rod 47 controlled in its turn by an arm secured to a shaft 48 carrying a pinion 49 meshing with a toothed wheel 50 keyed to a shaft 51 of the sprocket 6 that serves as a guide for the endless chain 12.

The movements of the piston 46 cause thus alternatingly the suction of the brine through the pipe 44 and its delivery through the pipe 42, but these movements are synchronized with the shifting of the endless chain 12 in a manner such that the brine may be distributed through the pipe 13 at the moment at which a carrier element 31, 32 of the chain (Fig. 5) passes underneath the latter while the suction is provided during the passage of the free space 52 separating two successive carrier elements.

As apparent from inspection of Fig. 1, the cooking device is constituted in the example illustrated by a tunnel shaped kiln 53 through which the conveyor 12 progresses and at the bottom of which is laid a perforated coil 54 connected through suitable pipes 55—56 with a common inlet 57 of steam whereby said steam is distributed inside the kiln and acts on the tins passing through same and also on the fish through the openings 25 in the covers 21 of the tins.

When the fish tins pass through the tunnel 53 there is provided on one hand a cooking of the fish and on the other hand during a very short time the absorption of a certain amount of salt.

The hot air kiln illustrated diagrammatically at 16 in Fig. 1 is formed by a sheet iron container 58 that assumes substantially the shape of a parallelopiped and is subdivided into three superposed compartments 59—60—61 (Figs. 9 and 10) by means of perforated partitions 62 and 63. Through the upper compartment 61 there passes an upper run of the chain 12 on which the tins assume an inverted position.

After passing through the upper compartment 61 the tins are again inverted as they pass with the chain 12 over the pulley 8 and may continue then progressing in their normal position in the lower compartment 59.

In the intermediary compartment 60 there is provided an admission of hot air which acts on the tins in the other compartments through the perforations in the partitions 62 and 63.

Preferably there are formed in sealed contact with the upper and lower surfaces of the container 58, jackets 64 and 65 which are also fed with hot air passing also through perforated partitions 66 and 67 into the compartments 59 and 61.

These jackets 64 and 65 extend, if they are provided at all, only over a fraction of the length of the upper and lower surfaces of the container 58 and they are arranged in a manner such that when the tins enter the drying container 58, the tins containing the sardines may be subjected first over a given section of their progression shown at P in Fig. 9, solely to the action of hot air passing through the partition 62. During this progression, the hot air may flow in the narow space left free between the bottom of each tin and the fish when the tin has been turned upside down over the pulley 7, whereby a slight shifting of the fish toward the temporary cover is obtained which improves the drying of the fish layer which faces the bottom of the tin and also eliminates any possibility of the skin of the fish adhering to the tin.

The air flowing through the outer partitions 66 and 67 serves also for the drying of fish but it acts also as a means for heating the tins.

The drying air flows in parallelism with the runs of the conveyor and this air flows then through a pipe 70 bent downwardly and opening into a channel 71 (Fig. 1) arranged horizontally in the lower part of the apparatus. From this channel 71 the air is fed transversely into a pipe 72 and is delivered through a fan 73 into the upper part of the apparatus (Fig. 2) whereby it again enters the container 58 after passing through an upwardly directed pipe 74 and it comes into contact at 75 with heating means constituted for instance by electrical resistances, radiators heated by the combustion of fuel oil or a combustible gas, or by steam or hot water flowing through coils.

As more particularly apparent in Fig. 10, the air after it has been heated at 75 is distributed simultaneously in the compartment 60 and in the jackets 64 and 65.

The fan 73 is controlled by an electric motor 76 (Fig. 3) which is connected by a lead 77 with a switchbox 78 from which there starts also a lead 79 feeding a motor 80 which controls the progression of the endless chain 12.

It is also of advantage to provide an arrangement for adjusting and measuring the hygrometric state of the drying air.

For the distribution of the covering liquid, it is possible to make the pipe 18 cooperate with a pumping system of the type illustrated in Fig. 11 and the operation of which is also synchronized with that of the endless chain 12. The suction is executed starting from a tank 81 (Fig. 1) while the delivery is provided through the distributor pipe 18.

The tunnel-shaped kiln 19 is constructed in substantially the same manner as the tunnel-shaped kiln 53 and it carries in its bottom a steam coil 82 connected through the pipe 83 with the inlet pipe 57, with the difference however that its top is double walled so as to form a jacket 84 also connected with the pipe 83 that is fed with steam.

This last tunnel-shaped kiln 19 may, if desired, be dispensed with. However, when employed with the present apparatus, it functions therein to eliminate the air contained in the tins.

The heating through the upper jacket 84 is obviously optional, but it is of advantage to provide such a heating with a view to avoiding any condensation of steam.

As they pass out of the kiln 19 or else after the covering of edible liquid has been distributed at 18, the temporary covers 21 are automatically removed by means of levers (not illustrated) which act on the knobs 41 and the pins 37 (Figs. 7 and 8) and are actuated by cams (not shown) the movement of which is synchronized with that of the endless chain 12.

The above disclosure allows ascertaining easily the operation of the apparatus as a whole.

This operation may be summarized diagrammatically as follows in the case of the apparatus described hereinabove and illustrated in the drawings:

I. At the inlet E a row of tins 23 is engaged on the endless chain 12 by means of a common temporary cover 21, which row is supplied by the conveyor 20.

II. Brine is added at 13.

III. Inside the kiln 53 the fish are cooked by means for instance of steam, the approximative temperature of which may be of about 80 to 100° C. The approximative duration of the cooking depends on the speed of the chain and ranges between 5 and 10 minutes.

IV. Inversion of the tins at 7 allows the brine to drain therefrom into the tray 15.

V. At 16, a second cooking operation is provided for instance by means of hot air, the temperature of which may be of about 130 to 180° C., the duration of the cooking ranging between 12 and 17 minutes.

This second cooking operation should be operated by means of a fluid devoid of moisture, such as hot air or superheated steam because it is during this stage that the water and fat contained in the fish are released.

VI. Inversion of the tins at 9, allows the liquid accumulated therein during the second cooking operation to drain therefrom, into the tray 17.

VII. At 18, there is added a covering of edible liquid.

VIII. Inside the kiln 19 the tins are preheated and the air exhausted therefrom before their final closing and sterilization.

The temperature of the steam in the jacket of the kiln top is of about 105° C. and the duration of its action ranges between 3 and 7 minutes.

The chief operations are therefore as follows:

(a) An addition of brine to the tins before filling thereof.

(b) Cooking of the tins in their normal position, said tins containing brine.

(c) Several successive cooking operations are performed in the tins either in their normal or their inverted position.

In the example illustrated, only two cooling operations are provided but their number may be increased according to requirements.

It is important to remark there is no oil-frying operation to be executed any more and the kiln 19 is provided only for the preheating of and the exhausting of air from the tins.

The method and apparatus according to the invention give important technical advantages which lead in particular to a substantial economy in labor by reason of the possibility of performing the different treatments in accordance with a continuous procedure.

This allows reducing the handling operation to a minimum and furthermore the stocks of grills heretofore provided in accordance with certain methods of handling fish during the different treatments and before tinning same may be entirely omitted. The overhead cost corresponding to the immobilization and upkeep of said grills is thus no longer necessary.

Lastly, because the fish are introduced inside the tins in their raw state and are not submitted to subsequent handling, the total yield of first grade products is considerably improved.

In prior methods it was necessary by reason of the numerous handlings to be performed, to consider about 15 to 20% of the fish as of lower grade, said lower grade fish being nevertheless tinned but sold however at a lesser price.

Obviously the embodiments disclosed have been given merely by way of examples and, without widening the scope of the invention, it is possible to bring numerous modifications to the performance of the method, to the sequence of operations and to the structure of the apparatus.

Thus in particular the nature of the fluid used may be selected according to requirements, and the size of the apparatus and of the different apparatuses should be chosen in accordance with the desired hourly output and with the kind of product to be obtained.

Different modifications can be introduced into the apparatus and process described above. Thus:

1. A small quantity of oil may be sprayed into the empty tins so as to supply them with a film of oil and to prevent the sticking of the skins of the fish to the tins.

2. During its passage in the hot air kiln effecting the second cooking process, the chains need not be horizontal but can be inclined. As Fig. 12 of the drawings shows, the runs $8^1$, $8^2$, $8^3$ of the chain 12 can be inclined in such a manner that on the run $8^1$ the tins may be backwardly tilted, and on the run $8^2$ the tins may be forwardly tilted, while on the run $8^3$ the tins are again backwardly tilted but in a more pronounced manner than on the run $8^1$. This arrangement ensures that the drops of water which still occur in the abdominal cavities of the fish shall be removed.

3. At the time of drainage, following the first cooking the chain can be vibrated to shake off the droplets of water still adhering to the fish. This vibration can be effected with the help of a blocking plate 90 (Fig. 12) which acts on the angle iron on which the chain rollers rest. This plate is driven by an eccentric 91 operated by a motor 92.

4. During the preheating of the fish which takes place in the tunnel-shaped kiln 19 said fish absorb a substantial amount of the edible oil supplied by the pipe 18 so that the amount of free oil is considerably diminished and in consequence oil to water ratio becomes particularly low. To overcome this undesirable condition and deficiency additional oil may be supplied to the tins before they arrive at the machine for setting. This may be effected as shown in Fig. 12, upon presentation of a tin 93 to an oil supply nozzle 94.

5. The pumping plants are provided with a "no can, no fill" mechanism of which the operation is such that when there are no tins under the distribution nozzle, the pumping of brine or oil to the distributor pipes 13 and 18 and/or the distributor nozzles 94 is stopped.

Fig. 13 of the appended drawings which corresponds to Fig. 11 shows that this device may comprise a lever 95 which is arranged above the chain 12 so as to be capable of being raised by a tin B, said lever being connected by a link 96 and a bell crank 97 to a valve actuating rod 97a adapted to contact and unseat a suction valve 98 and hold the same open when a tin is not present so that the aspirated brine or oil may be discharged back into the suction conduit 44 and the tank 45.

What we claim is:

1. An apparatus for canning sardines and like fish in a continuous process comprising an endless conveyor arranged in superposed forward and return runs and adapted to support a row of open fish-containing cans, perforated temporary covers for partially closing said open cans, complemental interlocking means carried by said conveyor and said temporary covers for detachably securing the latter to said conveyor and coincidentally therewith holding said covers on said open cans and retaining the latter on the conveyor as they travel in inverted position with the return runs thereof, liquid dispensing means disposed above the initial portion of a first one of the forward runs of the conveyor and arranged to dispense liquid into the cans as they pass underneath, a first tunnel-shaped kiln encasing a major portion of said first conveyor run and wherein the fish are subjected to a first cooking treatment, means for supplying steam to said first kiln, drain means disposed exteriorly of the discharge end of said kiln and arranged below the initial portion of the next lower return run to receive the liquid draining from the inverted cans through their perforated temporary covers, a second tunnel-shaped kiln encasing the remaining portion of said last mentioned return run and an initial portion of the next lower forward run of said conveyor and within which last mentioned kiln the fish are first subjected to a drying treatment and then a second cooking treatment, means for delivering heated air to said second tunnel-shaped kiln, drain means disposed exteriorly of the discharge end of said second kiln and arranged below the initial portion of the return run below said last mentioned forward run to receive the liquid draining from the cans through their perforated temporary covers upon the second inversion of said cans, liquid dispensing means disposed above the initial portion of the next lower forward run and arranged to dispense a covering of edible liquid into the open fish-containing cans as they pass underneath, and a third tunnel-shaped kiln encasing said last mentioned forward run and wherein the open cans with the fish and edible liquid contained therein are preheated and the air exhausted from the cans prior to their sealing and sterilization.

2. In an apparatus for canning sardines and like fish in a continuous process, said apparatus including an endless conveyor arranged in superposed forward and return runs and adapted to support a row of open fish-containing cans, perforated temporary covers for partially closing said open cans, and means for detachably securing said temporary covers to said conveyor and coincidentally therewith holding said covers on said open cans and retaining the latter on the conveyor as they travel in inverted position with the return runs thereof, the combination of: a compartmented casing wherein the fish are first subjected to a drying treatment and then to a cooking treatment, said casing being arranged to encase a portion of a return run of said conveyor and a portion of the next lower forward run of the conveyor, perforated partitions dividing said casing into three superposed compartments with the uppermost compartment serving as a fish drying chamber, the center compartment serving as a dry heated medium distributing chamber and the lowermost compartment serving as a fish cooking chamber, said uppermost compartment having said return run of said conveyor passing therethrough and said lowermost compartment having said next lower forward run of the conveyor passing through same, and means for supplying a dry heated medium to said center compartment for distribution through the perforations of said partitions into said uppermost and lowermost compartments to flow through same in parallelism with the return and forward runs of said conveyor travelling therethrough.

3. In an apparatus for canning sardines and like fish in a continuous process, said apparatus including an endless conveyor arranged in superposed forward and return runs and adapted to support a row of open fish-containing cans, and perforated means adapted to be detachably secured to said conveyor for temporarily and partially covering said open cans and holding the latter on the conveyor as they travel in inverted position with the return runs thereof, the combination of: a compartmented casing wherein the fish are first subjected to a drying treatment and then to a cooking treatment said casing being arranged to encase a portion of a return run of said conveyor and a portion of the next lower forward run of the conveyor, perforated partitions dividing said casing into three superposed compartments with the uppermost compartment serving as a fish drying chamber and accordingly having said return run of said conveyor passing therethrough, the center compartment serving as a dry heated fluid distributing chamber, and the lowermost compartment serving as a fish cooking chamber and accordingly having said next lower forward run of said conveyor passing therethrough, said uppermost and lowermost compartments being closed at their rear ends and intercommunicating at their forward ends and said center compartment being closed at its ends and open at one side thereof, jackets encasing corresponding portions of the top and bottom walls of said casing to form dry heated fluid distributing chambers above and below said casing, said top and bottom walls having perforations through which said chambers communicate with said uppermost and lowermost compartments, respectively, and said top and bottom dry heated fluid distributing chambers having intercommunication at a common side with the open side of said center compartment, a dry heated fluid circulating conduit connecting the intercommunicating ends of said uppermost and lowermost compartments with the intercommunicating open sides of said center compartment and top and bottom dry heated fluid distributing chambers, fluid heating means disposed in said dry heated fluid circulating conduit, and means mounted in said circulating conduit for injecting the dry heated fluid transversely into said center compartment and said top and bottom dry heated fluid distributing chambers for circulation through the perforated walls thereof and longitudinal circulation through said uppermost and lowermost compartments in parallelism with the return and forward runs of said conveyor travelling therethrough.

4. In an apparatus for canning sardines and like fish in a continuous process, said apparatus including an endless conveyor arranged in superposed forward and return runs for conveying open fish-containing cans alternately in upright and inverted position along a predetermined path, and a perforated temporary cover for partially closing each of said open fish-containing cans, the combination of: complemental means for detachably securing each perforated temporary cover to said conveyor and coincidentally therewith holding said cover on its associated open fish-containing can in a manner effective to retain the same on the conveyor as it travels in inverted position with the return runs thereof, said complemental means comprising a perforated lug secured to and extending upwardly from one side of said conveyor, said lug having a relatively narrow entrance slot into the perforation thereof, a manually operable and shouldered latching pin slidably mounted upon said perforated temporary cover adjacent the end thereof in transverse relation to said perforated lug, said shouldered latching pin having a portion adapted to fit within the perforation of said lug but somewhat larger than the slot thereof, and a second portion of a diameter adapted to pass through said slot, and spring means arranged to yieldingly hold the first mentioned portion of said latching pin in seated relation within the perforation of said lug.

References Cited in the file of this patent
UNITED STATES PATENTS

| | | |
|---|---|---|
| 1,335,136 | Stuart | Mar. 30, 1920 |
| 1,391,821 | Davies | Sept. 27, 1921 |
| 1,779,611 | Merrill | Oct. 28, 1930 |
| 1,843,995 | Thompson | Feb. 9, 1932 |
| 1,892,627 | Pearson | Dec. 27, 1932 |
| 1,894,738 | Gardner | Jan. 17, 1933 |
| 1,915,648 | De Reamer | June 27, 1933 |
| 1,942,830 | Peebles et al. | Jan. 9, 1934 |
| 2,001,781 | Gammeter | May 21, 1935 |
| 2,055,230 | David | Sept. 22, 1936 |
| 2,058,849 | Bergen | Oct. 27, 1936 |
| 2,060,232 | Manning et al. | Nov. 10, 1936 |
| 2,121,370 | Touton | June 21, 1938 |
| 2,446,889 | Sjostrom | Aug. 10, 1948 |
| 2,488,970 | Ganucheau | Sept. 7, 1948 |
| 2,520,719 | Hanson | Aug. 29, 1950 |